United States Patent [19]

Thomas

[11] 3,808,527

[45] Apr. 30, 1974

[54] ALIGNMENT DETERMINING SYSTEM

[75] Inventor: Donald Ralph Thomas, Westford, Vt.

[73] Assignee: International Business Machines Corporation, Armonk, N.Y.

[22] Filed: June 28, 1973

[21] Appl. No.: 374,296

[52] U.S. Cl. .................. 324/65 R, 29/574, 29/578, 324/64

[51] Int. Cl. .......................................... G01r 27/02

[58] Field of Search ....... 324/65 R, 64; 29/574, 578

[56] References Cited

UNITED STATES PATENTS

| | | | |
|---|---|---|---|
| 3,475,097 | 10/1969 | Bishop et al. | 29/578 X |
| 3,487,301 | 12/1969 | Gardner et al. | 324/64 |
| 3,585,712 | 6/1971 | Boncuk | 29/574 |
| 3,745,358 | 7/1973 | Firtz et al. | 29/578 X |

*Primary Examiner*—Stanley T. Krawczewicz
*Attorney, Agent, or Firm*—Stephen J. Limanek

[57] ABSTRACT

Method and apparatus for electrically measuring the alignment between a first design or element on an object such as a wafer and a second design or element formed by, e. g., a mask superimposed on the object or wafer. The design on the wafer may be at least one resistive point in a resistive area in or on the wafer and the design formed by the mask may be at least one contact point in at least one contact located in one or more apertures of the mask and disposed on the resistive area. The resistive area is preferably an elongated resistor having a pair of spaced points defining a known distance between which a voltage is determined after passing a current through the resistor or resistive area. Voltages between selected combinations of the points is determined. The misalignment, if any, is calculated from these voltages and the known distance between the pair of spaced points.

16 Claims, 7 Drawing Figures

ALIGNMENT DETERMINING SYSTEM

FIELD OF THE INVENTION

This invention relates to a method and apparatus for measuring the alignment or the amount of misalignment between two designs in or on an object, disc or wafer particularly when these two designs are sequentially formed in or on the object, disc or wafer in a preferred relationship to each other.

In the fabrication of integrated circuits in semiconductor wafers, several diffusion steps involving various masking techniques are generally employed. Different electrical properties are obtained in semiconductor material by the selective diffusion of impurities such as boron, aluminum, phosphorous or arsenic into small areas on the semiconductor wafer. When devices, e.g., transistors are made to form integrated circuits, the semiconductor wafer is subjected to a number of different diffusion steps, prior to each of which the wafer is provided with an oxide coating and openings are made at appropriate locations in the coating defined by the use of masks, in accordance with the known techniques. Emitters, bases and collectors of transistors have to be precisely located in the wafer to provide the desired electrical characteristics. Generally, these elements of the transistor are formed sequentially in the wafer by using a different mask to make each element.

The determination of the degree or amount of misalignment between masks can serve as a prediction at an early stage in the process of making the device of the success of the operability of the device.

DESCRIPTION OF THE PRIOR ART

Various systems have been provided in an attempt to accurately position photo masks with respect to the semiconductor wafers which are being processed for the formation of integrated circuits. One such mask alignment system, described in U.S. Pat. No. 3,461,566 utilizes two designs on a mask and two corresponding designs on a disc. The alignment is effected by a two step process by bringing one design on the mask and one design on the disc into alignment with each other and then rotating the mask and the disc with respect to each other about a pivot axis that passes through the already aligned designs until the other design on the mask is aligned with the other design on the disc. Another alignment technique, disclosed in U.S. Pat. No. 3,588,347, employs both visible and infrared radiation to properly align a mask with a wafer. Yet another alignment system uses rod-shaped electromechanical transducers, as described in U.S. Pat. No. 3,569,718.

After portions of an apparatus, device or circuit have been made, it is often desirable to know whether the parts thereof are aligned so as to properly cooperate with one another. In U.S. Pat. No. 3,614,601 apparatus is described which is used to determine whether contact points fall within and without desired limits. In the fabrication of integrated circuits, it is often desired to know not only whether parts fall within certain limits but also the precise amount of deviation or misalignment. Heretofore, much of this information was determined by employing merely tedious, time consuming visual techniques, or electrical structures measuring to only certain size brackets.

SUMMARY OF THE INVENTION

Accordingly, it is an object of this invention to measure more accurately misalignment, if any, of, e.g., semiconductor integrated circuit designs than by known techniques.

It is another object of this invention to provide measurements of mask alignment in semiconductor wafer processing which are independent of etch bias, photoresist development or mask image size variations.

Yet a further object of this invention is to determine the amount of misalignment of a mask used to make semiconductor elements or circuits on a wafer by measuring voltage differentials between selected points and a length between a pair of spaced points in a resistor formed in or on the wafer.

These and other objects of the invention are attained by establishing at least first, second and third points on an elongated resistor of uniform resistivity, the first point being located between the second and third points, with the first point being related to a first object and the second and third points being related to a second object which is to be aligned with the first object. A constant current is passed through the resistor and the first, second and third points are arranged in series in the direction of the current path. Voltages are measured from the first point to the second point and to the third point and an additional voltage is measured between a pair of points spaced apart by a known distance in the direction of the path of the current. The deviation of the location of the first point with respect to the midpoint between the second and third points is equal to the difference in the voltages measured between the first point and the second point and the first point and the third point divided by two times the voltage between the pair of points with this quotient multiplied by the known distance between the pair of points.

In the semiconductor technology, the first object is generally a silicon wafer and the second object is a mask having a design which is used to form in the silicon wafer minute elements or parts which are to cooperate with previously established minute elements or parts in the wafer to form electrical devices or circuits.

The foregoing and other objects, features and advantages of the invention will be apparent from the following more particular description of the preferred embodiments of the invention, as illustrated in the accompanying drawings.

DESCRIPTION OF THE PREFERRED EMBODIMENTS

Figure 1:
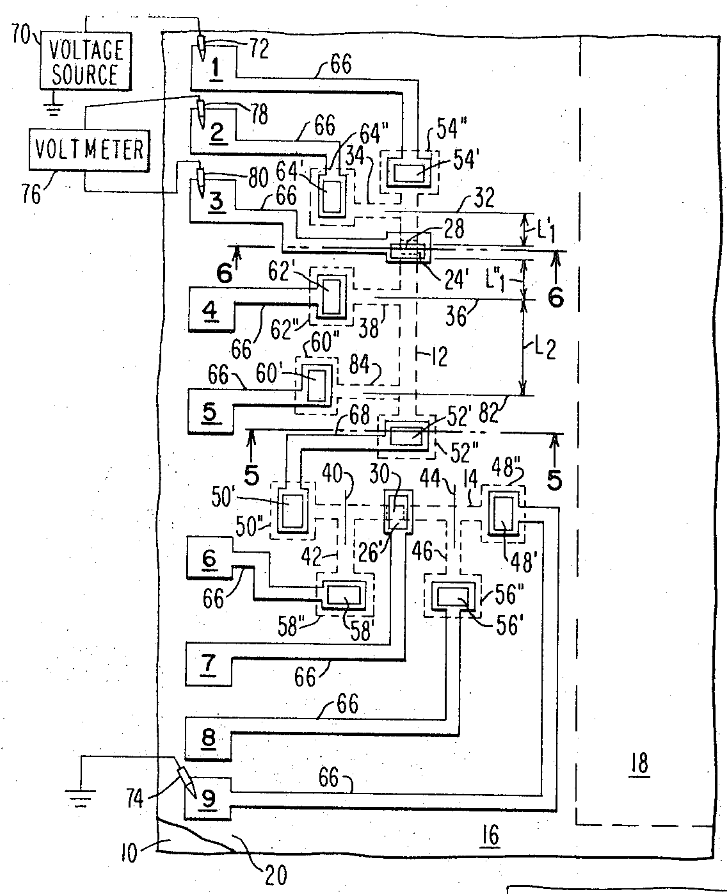
FIG. 1 is a plan view of a portion of a semiconductor wafer showing an embodiment of a circuit used for determining alignment of a mask with respect to an existing diffusion pattern or design on the wafer.
Figure 2:
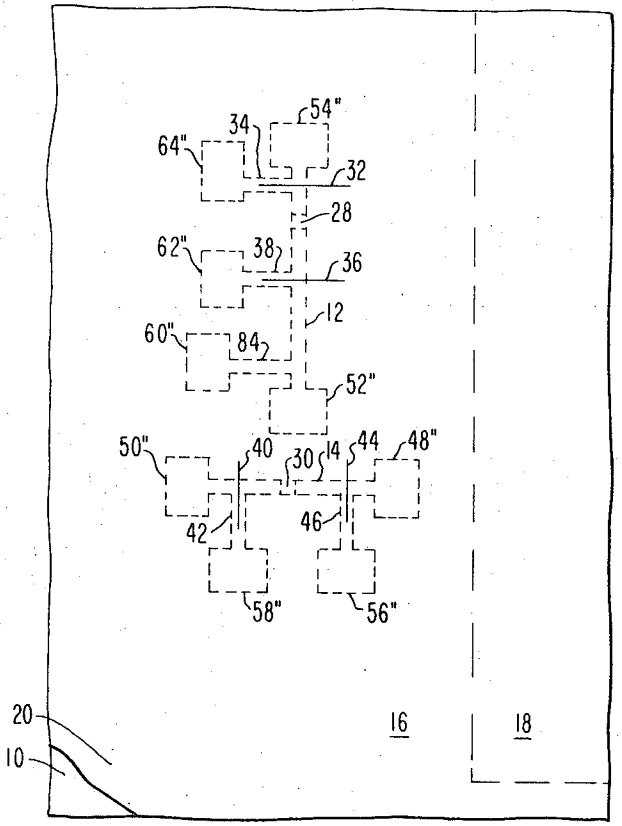
FIG. 2 illustrates the diffusion pattern used in FIG. 1.

Referring now to the drawings in more detail, there is shown in FIG. 1 a portion of a semiconductor wafer or chip 10, preferably made of silicon in which there has been produced diffusion patterns 12, 14 in a kerf area or test site 16 adjacent to, e.g., an array area 18 in which memory circuitry may be disposed. The diffusion patterns 12, 14 may be produced by any known techniques employing a conventional mask and a suitable impurity such as boron, arsenic or phosphorous. The diffusion patterns 12, 14 are shown more clearly in FIG. 2 of the drawing. An insulating layer 20 made, for example, of silicon dioxide, is formed on the wafer 10 over the patterns 12, 14. It should be understood that the diffusion patterns 12, 14 are produced simultaneously with other patterns for making a portion or element of a device or circuit in, e.g., the array area 18 with the use of a single mask.

Figure 3:
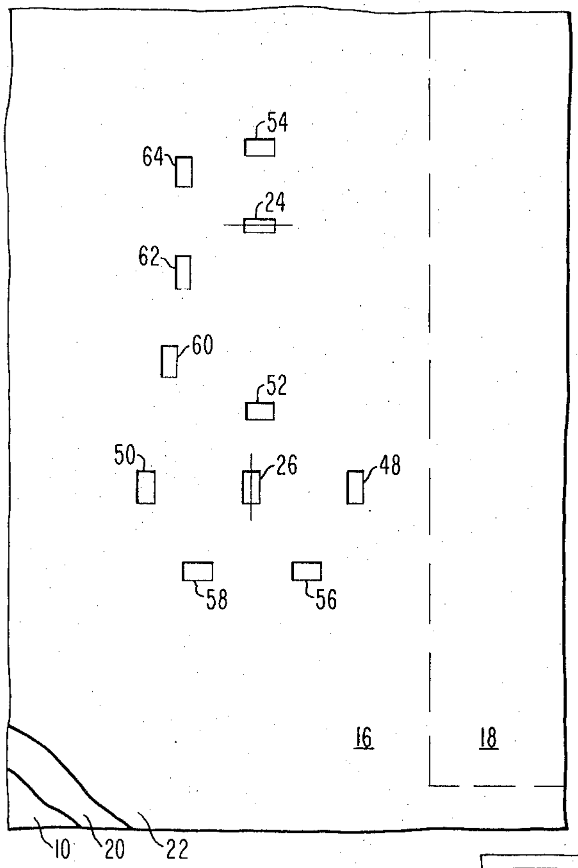
FIG. 3 shows a mask used to provide contacts for making electrical connections to the diffusion pattern of FIG. 1 or 2.

When a mask 22, shown in FIG. 3 of the drawing, is required to produce in the array are 18 other portions or elements of the device or circuit which must cooperate with the portion or element already formed in the array area 18, precise alignment of the mask 22 with the existing patterns in the wafer 10 is generally necessary. Alignment systems such as those described hereinabove are used to appropriately locate the mask 22 on the wafer 10. Although these systems are generally highly sensitive, misalignment occurs on many occasions.

In accordance with the present invention, mask 22 shown in FIG. 3 is provided with apertures 24, 26 which are located therein so as to be positioned over diffusion patterns 12, 14, respectively. When mask 22 is precisely aligned with wafer 10 in a vertical direction, aperture 24 will cover all of registration area 28 of diffusion pattern 12, shown in FIG. 2, and in a horizontal direction, aperture 26 will cover all of registration area 30 of diffusion pattern 14. The registration area 28 is located midway between the centerline 32 of diffusion arm 34 and the centerline 36 of diffusion arm 38 and has a vertical dimension determined by and equal to the vertical dimension of aperture 24 in mask 22. The registration area 30 is located midway between the centerline 40 of diffusion arm 42 and the centerline 44 of diffusion arm 46 and has a horizontal dimension determined by and equal to the horizontal dimension of aperture 26 in mask 22.

Figure 4:
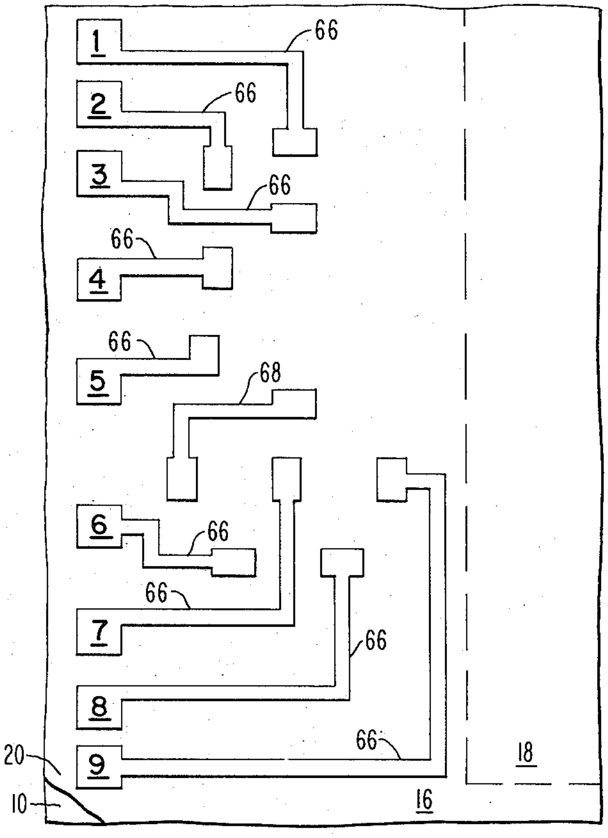
FIG. 4 illustrates a plurality of metallic lines extending from contact pads to the contacts shown in FIG. 1.

To determine the actual location of the apertures 24, 26 with respect to the registration areas 28, 30, respectively, mask 22 is provided additionally with a set of apertures 48, 50, 52 and 54 for forming current carrying contacts 48', 50', 52' and 54' on contact targets 48'', 50'', 52'' and 54'' in diffusion patterns 12, 14 and a set of apertures 56, 58, 60, 62 and 64 for forming voltage probe contacts 56', 58', 60', 62' and 64' on contact targets 56'', 58'', 60'', 62' and 64'' in diffusion patterns 12, 14, shown in FIG. 1 of the drawing. Contacts 24' and 26' are formed on diffusion patterns 12 and 14, respectively, through apertures 24 and 26 in mask 22. Contact to the diffusion through the apertures formed by mask 22 may be produced by any known technique such as by vacuum evaporation of aluminum through the apertures. Probe pads 1 through 9 are electrically connected to appropriate contacts through lines 66 as shown in FIG. 1. Pads 1 through 9 and lines 66 which may be made of aluminum are formed on silicon dioxide layer 20, as shown more clearly in FIG. 4 of the drawing. A line 68, similar to lines 66, interconnects contacts 50' and 52'. A voltage source 70 connected between a point of ground potential and pad 1 via a probe 72 supplies a constant current I through diffusion pattern 12 between contacts 54' and 52' and through diffusion pattern 14 between contacts 50' and 48' when pad 9 is connected to ground potential through probe 74. A suitable voltmeter 76 having attached thereto a pair of probes 78 and 80 is provided to measure voltage differences between various pairs of pads 2 through 8 connected to diffusion patterns 12, 14, which are resistive patterns or diffused resistors through which current I is flowing producing voltage drops or differentials.

In order to determine the alignment of mask 22 with respect to the wafer 10, or, more particularly the alignment of the center of contact 24' with respect to the center of registration area 28, the invention uses the relationship $R=\rho L/W$, where R is the resistance value of a segment of the diffusion patterns 12, 14, $\rho$ is its sheet resistivity, L is its length and W is its width.

The length $L'_1$ between the contact 24' shown in FIG. 1 of the drawing and centerline 32 of arm 34 is:

$$L'_1 = L_n + \Delta L_e + \Delta L_{va},$$

where $L_n$ is equal to the nominal or design length between centerline 32 and registration area 28, $\Delta L_e$ is the distance due to over etching of contact 24' and diffusion pattern 12 and $\Delta L_{va}$ is the amount of misalignment in the vertical direction between the center of contact 24' and centerline 32 of arm 34, assuming a misalignment of contact 24' away from centerline 32.

The resistance of diffusion pattern 12 between the centerline 32 and contact 24' is:

$R_{2-3} = V_{2-3}/I$, where $V_{2-3}$ is the voltage from centerline 32 to contact 24' is determined by voltmeter 76 when probes 78 and 80 are contacting pads 2 and 3, respectively.

Also, since $R_{2-3} = \rho/W\, L'_1$, then $$R_{2-3} = \rho/W\,(L_n + \Delta L_e + \Delta L_{va}).$$

Likewise, the length $L''_1$ between contact 24' and centerline 36 of arm 38 is $L''_1 = L_n + \Delta L_e - \Delta L_{va}$, since contact 24' is assumed to be misaligned toward centerline 36 of arm 38.

The resistance of diffusion pattern 12 between the centerline 36 and contact 24' is $$R_{3-4} = V_{3-4}/I,$$

where $V_{3-4}$ is the voltage between centerline 36 and contact 24' as determined by voltmeter 76 when probes 78 and 80 are contacting pads 3 and 4, respectively.

Furthermore, $$R_{3-4} = \rho/W\, L''_1 = \rho/W\,(L_n + \Delta L_e - \Delta L_{va})$$

The resistance of a known length $L_2$ of diffusion pattern 12, e.g., between centerline 36 of arm 38 and centerline 82 of arm 84, is:

$$R_{4-5} = V_{4-5}/I = \rho/W\,L_2, \text{ where } V_{4-5}$$

is the voltage measured between pads 4 and 5, or $$\rho/W = V_{4-5}/IL_2.$$

To determine the value of $\Delta L_{va}$, $R_{3-4}$ is subtracted from $R_{2-3}$.

$$R_{2-3} - R_{3-4} = \rho/W\,2\Delta L_{va},$$

or $$V_{2-3}/I - V_{3-4}/I = V_{4-5}/IL_2\,(2\Delta L_{va}),$$

where $$\Delta L_{va} = L_2\,(V_{2-3} - V_{3-4})/2V_{4-5}$$

Accordingly, $\Delta L_{va}$, the misalignment, is determined simply by measuring the voltages $V_{2-3}$, $V_{3-4}$ and $V_{4-5}$ and the length $L_2$. It should be noted that because $L_2$ is long compared with the length $L_n$ and because the diffusion arms 38 and 84 tend to sense the voltage at the center of the respective arms, i.e., between centerlines 36 and 84 in diffusion area 12, one can use the nominal design value of $L_2$ in the above calucation with a high degree of accuracy.

It should be understood that an additional resistance or perturbation term R′ due to the bending of field lines near the junction of arm 34 and the main diffusion path between contacts 52′ and 54′ and again near the junction of arm 38 and the main diffusion path need not be considered in determining $R_{2-3}$ and $R_{3-4}$ since these terms are substantially equal and cancel out.

The distance $L_2$ should be established at a length which is 50 to 100 times larger than the maximum probable misalignment error of any commercial alignment system or of the actual alignment system used to align the mask 22 on the wafer 10. For example, $L_2$ may be equal to six to ten mils when the probable alignment system is a maximum of 150 microinches.

It should be noted that this invention measures electrically a layer-to-layer alignment in, e.g., an integrated circuit manufacturing process and that the alignment term $\Delta L_a$ is independent of any etch biases or photoresist development or variation or mask image size variation. Furthermore, it should be noted that the invention provides an exact measurement of any misalignment and not only an approximation of the misalignment.

Figure 5:
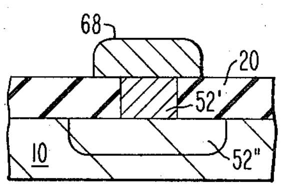
FIG. 5 is a sectional view taken through line 5—5 of FIG. 1.
Figure 6:
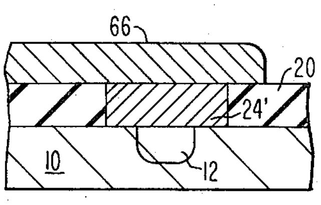
FIG. 6 is a sectional view taken through line 6—6 of FIG. 1.

Although the contacts, such as contact 42′, generally have a lower surface contacting only the surface of the diffusion pattern 12 or 14, and more particularly contact target 52″ of diffusion pattern 12, as shown in sectional view in FIG. 5 of the drawing, other contacts, such as contact 24′, may be extended beyond the diffusion pattern 12 or 14, as shown in sectional view in FIG. 6 of the drawing without adversely affecting the measuring circuit or apparatus provided the contact forms a non-ohmic bond to or rectifying contact with the silicon wafer 10.

Accordingly, it can be seen that by simply measuring the voltages between pads 2 and 3, 3 and 4, and 4 and 5 and knowing the nominal design length $L_2$, the alignment or misalignment in a vertical direction of mask 22, and more particularly contact 24′, with respect to wafer 10, and more particularly with respect to the center or midpoint between arms 34 and 38 of diffusion pattern 12, is obtained.

Likewise, the alignment or misalignment in a horizontal direction of mask 22 with respect to wafer 10 is obtained by measuring the voltages between pads 6 and 7 and 7 and 8 and utilizing the voltage measurement between pads 4 and 5 and the length $L_2$ in the equation $$\Delta L_{ha} = L_2\,(V_{6-7} - V_{7-8})/2V_{4-5}.$$

The horizontal alignment $\Delta L_{ha}$ is obtained more particularly by determining the location of the center of contact 26′ with respect to the midpoint between the centerline 40 of arm 42 and the centerline 44 of arm 46 of diffusion pattern 14.

Figure 7:
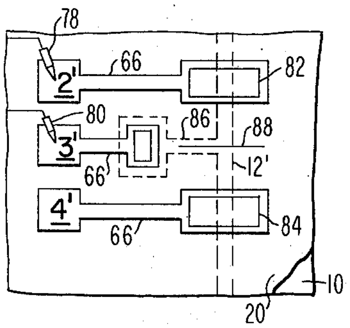
FIG. 7 illustrates a portion of a circuit which may be used in another embodiment of the invention.

In FIG. 7 there is shown a modification of a portion of the apparatus of circuit of FIG. 1 of the drawing providing another embodiment of the present invention. In the embodiment of FIG. 7, two conductors 82 and 84 formed with the aid of a mask, such as conductor 24′ of FIG. 1 formed by mask 22, are disposed on a diffusion pattern 12′ similar to diffusion pattern 12 but differing therefrom in that only one arm 86 is provided instead of the two arms 34 and 38 shown in FIG. 1. The alignment or misalignment $\Delta L_{va}$ is obtained by determining the location of the midpoint between conductors 82 and 84 with respect to centerline 88 of arm 86.

Accordingly $\Delta L_{va} = L_2(V_{2'-3'} - V_{3'-4'})/2V_{x-y}$, where $V_{2'-3'}$ is the voltage between pads 2′ and 3′, $V_{3'-4'}$ is the voltage between pads 3′ and 4′, and $V_{x-y}$ is the voltage between two points $x$ and $y$ on diffusion pattern 12′ spaced apart by the distance $L_2$ and determined as described in connection with the determination of voltage $V_{4-5}$ in the embodiment of FIG. 1.

It should be understood that resistive patterns other than diffusion patterns, such as patterns 12, 12′ and 14, may be used to carry out the teachings of the present invention. For example, if desired, a polysilicon layer may be substituted for the diffusion patterns 12, 12′ and 14.

It can be seen that the apparatus or circuits of the present invention provide measurements which are amenable to automatic processing and which can be provided rapidly, inexpensively and reliably.

While the invention has been particularly shown and described with reference to the preferred embodiments thereof, it will be understood by those skilled in the art that various changes in form and details of the apparatus and method may be made therein without departing from the spirit and scope of the invention and that the method is in no way restricted by the apparatus.

What is claimed is:

1. An alignment determining system comprising
a first object including a resistive pattern disposed thereon, said pattern having an identifiable element therein,
means for passing current through said resistive pattern,
a second object having a given element therein,
conductive means having an electrical conductor in a known relationship to said given element disposed on said resistive pattern, and
means for measuring voltage differences along said resistive pattern in relation to said conductor to determine the distance between said identifiable and given elements.

2. A system as set forth in claim 1 wherein said first object is a semiconductor wafer and said resistive pattern is a diffusion pattern.

3. A system as set forth in claim 2 wherein said second object is a mask having an aperture therein and said conductor is disposed within said aperture of said mask.

4. A system as set forth in claim 1 wherein said resistive pattern has first and second points therein and said conductor is disposed between said first and second points.

5. A system as set forth in claim 4 wherein said voltage difference measuring means determines a first voltage between said conductor and said first point, a second voltage between said conductor and said second point and a third voltage between two points on said pattern spaced apart by a known distance.

6. A system as set forth in claim 5 wherein the difference ΔL in location between said identifiable element and said given element is derived in accordance with the relationship $\Delta L = L(V_1 - V_2)/2V_3$, where $V_1$, $V_2$ and $V_3$ are said first, second and third voltages and L is equal to said known distance.

7. A system as set forth in claim 1 wherein said conductive means further includes a second conductor having a known relationship to said given element disposed on said resistive pattern and said identifiable element is disposed between said conductors and said measuring means measures voltage differences in relation to said conductors.

8. A system as set forth in claim 7 wherein said voltage difference measuring means determines a first voltage between said electrical conductor and said identifiable element, a second voltage between said second conductor and said identifiable element and a third voltage between two points on said pattern spaced apart by a known distance.

9. A system as set forth in claim 8 wherein the difference ΔL in location between said identifiable element and said given element is derived in accordance with the relationship $\Delta L = L(V_1 - V_2)/2V_3$, where $V_1$, $V_2$ and $V_3$ are said first, second and third voltages and L is equal to said known distance.

10. An alignment determining system comprising a semiconductor wafer having a resistive pattern disposed thereon, said pattern having first and second known points, means for passing current through said resistive pattern, a mask having an aperture therein, an electrical conductor disposed in said aperture in contact with said resistive pattern, and means for measuring a first voltage between said first point and said conductor, a second voltage between said second point and said conductor and a third voltage between two points on said pattern spaced apart by a known distance, the alignment variation ΔL of said conductor with respect to the midpoint between said first and second points is $L(V_1 - V_2)/2V_3$, where $V_1$, $V_2$ and $V_3$ are said first, second and third voltages and L is equal to said known distance.

11. An alignment determining system comprising a semiconductor wafer having a resistive pattern disposed thereon, said pattern having a known point, means for passing current through said resistive pattern, a mask having first and second apertures therein, first and second conductors disposed in said first and second apertures, respectively, in contact with said resistive pattern, and means for measuring a first voltage between said first conductor and said known point, a second voltage between said second conductor and said known point and a third voltage between two points on said pattern spaced apart by a known distance, the alignment variation ΔL of said known point with respect to the midpoint between said first and second conductors is $L(V_1 - V_2)/2V_3$, where $V_1$, $V_2$ and $V_3$ are said first, second and third voltages and L is equal to said known distance.

12. A method for determining the alignment of a mask with respect to a semiconductor wafer comprising forming a resistive pattern in said wafer, forming at least one contact on said resistive pattern through an aperture in said mask, passing current through said resistive pattern, measuring a voltage difference between said at least one contact and at least one point on said pattern and another voltage difference across a known distance along said pattern, and calculating the alignment variation ΔL in accordance with the relationship $\Delta L = L(V_1 - V_2)/2V_3$, where $V_1$ and $V_2$ are voltages meeasured between two different distances between one of said at least one contact and one of said at least one point, $V_3$ is said another voltage and L is equal to said known distance.

13. A method as set forth in claim 12 wherein said voltage differences are measured between a first point on said pattern and one contact of said at least one contact and a second point on said pattern and said one contact.

14. A method as set forth in claim 12 wherein first and second contacts are formed on said pattern through first and second apertures, respectively, in said mask and said voltage differences and measured between said first contact and one point on said pattern and said second contact and said one point.

15. An alignment determining system comprising a first object including a resistive component having first, second and third points serially arranged therein, a second object, said first and second points being related to one of said objects and said third point being related to the other of said objects and disposed between said first and second points, means for passing current through said resistive component, and means for measuring a first voltage between said first point and said third point, a second voltage between said second point and said third point and a third voltage between two points on said resistive component spaced apart by a known distance, the alignment variation of said third point with respect to the midpoint between said first and second points being $L/2\ (V_1 - V_2)/V_3$, where $V_1$, $V_2$ and $V_3$ are said first, second and third voltages and L is equal to said known distance.

16. A system as set forth in claim 15 wherein said resistive component has a segment arranged orthogonal to the direction of said serially arranged points and said measuring means measures voltages between first, second and third points on said segment to determine misalignment in the direction of said segment.

* * * * *

PO-1050
(5/69)

UNITED STATES PATENT OFFICE
CERTIFICATE OF CORRECTION

Patent No. 3,808,527 Dated April 30, 1974

Inventor(s) Donald Ralph Thomas

It is certified that error appears in the above-identified patent and that said Letters Patent are hereby corrected as shown below:

Column 3, line 62, change "62'" to --62"--; line 66, after "through" insert --apertures in insulating layer 20 defined by--.

Column 7, line 7, change "a mask" to --an insulating layer--; line 9, change "mask" to --layer--; line 54, change "a mask" to --an insulating layer--. Column 8, line 6, change "a mask" to --an insulating layer--; line 35, change "meeasured" to --measured.

Signed and sealed this 19th day of November 1974.

(SEAL)
Attest:

McCOY M. GIBSON JR.
Attesting Officer

C. MARSHALL DANN
Commissioner of Patents